United States Patent [19]

Tsuchiya

[11] Patent Number: 4,749,727
[45] Date of Patent: Jun. 7, 1988

[54] PROCESS FOR THE PREPARATION OF FILM-FORMING RESIN COMPOSITION

[75] Inventor: Masuo Tsuchiya, Hiratsuka, Japan

[73] Assignee: Kansai Paint Co., Ltd., Hyogo, Japan

[21] Appl. No.: 791,405

[22] Filed: Oct. 25, 1985

Related U.S. Application Data

[63] Continuation of Ser. No. 589,591, Mar. 14, 1984, abandoned.

[30] Foreign Application Priority Data

Mar. 18, 1983 [JP]  Japan ................................. 58-45711

[51] Int. Cl.$^4$ ..................... C08G 59/14; C08F 283/10
[52] U.S. Cl. ............................. 522/170; 204/157.64; 525/922; 528/26; 528/27
[58] Field of Search ........................................ 522/170

[56] References Cited

U.S. PATENT DOCUMENTS 4,434,210  2/1984  Nakajima ............................ 428/447
4,436,787  3/1984  Mikami ............................... 428/447

OTHER PUBLICATIONS

Derwent Abstract 83-761835/37, Aug. 1983, Kansai.

Primary Examiner—John C. Bleutge
Assistant Examiner—Arthur H. Koeckert
Attorney, Agent, or Firm—Fisher, Christen & Sabol

[57] ABSTRACT

Disclosed is a process for the preparation of a three dimensionally crosslinkable film-forming resin composition which process comprises irradiating an electron beam in an irradiation dose of from 0.1 to 40 Mrad onto a mixture of a film-forming resin with an alkoxysilane compound having a polymerizable unsaturated group for radical polymerization therebetween.

5 Claims, No Drawings

PROCESS FOR THE PREPARATION OF FILM-FORMING RESIN COMPOSITION

This is a continuation of application Ser. No. 589,591, filed Mar. 14, 1984, now abandoned.

BACKGROUND OF THE INVENTION

1. Field of the Invention

This invention relates to a process for the preparation of a film-forming resin composition, and more particularly relates to a process for the preparation of a three dimensionally crosslinkable film-forming resin composition formed by graft polymerization of an alkoxysilane compound having a polymerizable unsaturated group onto a film-forming resin.

2. Description of the Prior Art

The thermoplastic resin such as polyvinyl chloride, phenoxy resin, and the like has been used in a coating composition. However, the aforementioned resins have such disadvantages as to have little or no reactive functional group for crosslinking reaction, and to be extremely difficult for a film to be crosslinked for curing, resulting in that the film formed therefrom is unsatisfactory in such properties as solvent resistance, corrosion resistance, water resistance, and the like.

In order to overcome the aforementioned defects of the resins having little or no reactive functional group for crosslinking reaction, Japanese Patent Application No. 14212/1982 discloses a process which comprises effecting a radical reaction of an alkoxysilane compound having an unsaturated group onto hydrogen and/or a halogen atom contained in the aforementioned resins and drawn by a radical in the presence of a free-radical initiator. According to the process of the aforementioned Japanese patent application, the alkoxysilane group is added to the skeleton of the resin, and the resulting addition product solution in an organic solvent is coated followed by hydrolyzing the alkoxysilane group to obtain a three dimensionally crosslinked and cured film. The crosslinked and cured film exhibits excellent properties in solvent resistance and water resistance as well as in physical properties, corrosion resistance, weather resistance, and the like.

That is, according to the aforementioned process, such resins as polyvinyl chloride resin and phenoxy resin, for which it is impossible or extremely difficult to form a three dimensionally crosslinked and cured film, can very easily be formed to a three dimensionally crosslinked film, resulting in remarkable improvements in water resistance, corrosion resistance, solvent resistance, weather resistance, physical properties, and the like without reduction in the excellent adherance which the aforementioned resins originally possess to plastics and metal.

However, according to the process of the Japanese patent application, it is rather difficult to carry out sufficiently the reaction between the alkoxysilane compound having an unsaturated group and the aforementioned resins, and consequently properties of the film formed therefrom are not expected to be remarkably improved. Thus, the aforementioned process has such disadvantages that the costly alkoxysilane compound is needed to be used in a large amount, that the reaction effected at high temperatures for a long period of time results in deterioration due to gelation or coloring of the resin, and that the process is economically undesirable when the aforementioned reaction is to be carried out sufficiently. Further, the aforementioned process has such a disadvantage that the resin used in the process is limited to relatively highly reactive resins having such a hydrogen and/or halogen atom as to be drawn by a radical.

SUMMARY OF THE INVENTION

It is an object of this invention to provide a process for the preparation of a film-forming resin composition which is capable of preparing a film-forming resin composition three dimensionally crosslinkable very easily and efficiently at a low temperature in a short period of time.

It is another object of this invention to provide a process for the preparation of a film-forming resin composition in which a variety of resins may be used as the film-forming resin.

That is, the present invention provides a process for the preparation of a three dimensionally crosslinkable film-forming resin composition which process comprises irradiating an electron beam in an irradiation dose of from 0.1 to 40 Mrad onto a mixture of a film-forming resin with an alkoxysilane compound having a polymerizable unsaturated group for radical polymerization therebetween (hereinafter simply referred to as "a silane compound").

According to the process of the present invention, an efficient graft polymerization of the silane compound onto the film-forming resin results in the formation of a film-forming resin composition essentially consisting of a resin three dimensionally crosslinkable very easily on film formation (hereinafter may simply be referred to as "a silane-modified resin"). Details of the reaction mechanism of the aforementioned graft polymerization by the electron beam irradiation are not clear, but the aforementioned process of the present invention provides the following advantages:

(1) High energy of the electron beam permits a sufficient graft polymerization even between a silane compound and a film-forming resin which have a poor reactivity in a catalytic reaction to obtain a film-forming resin composition of the present invention by use of a small amount of the silane compound.

(2) Since the reaction system requires substantially no solvent, efficiency of the graft polymerization is high.

(3) Since the reaction system contains no catalyst fragments, deterioration of the resin is not accelerated.

(4) The aforementioned reaction in the process of the present invention may be carried out without heating even at a temperature lower than room temperature, resulting in no side reaction.

(5) The reaction is carried out for such a short period of time as to provide high productivity without producing any side reactions and without impairing the original properties of the film-forming resin.

(6) In the case where no solvent is used in the reaction system, the silane-modified resin is obtained in the solid state such that the solvent used for coating is widely selected.

DETAILED DESCRIPTION OF THE PREFERRED EMBODIMENTS

In the practice of the process of the present invention, a film-forming resin and a silane compound, and, as required, an organic solvent and/or a polymerizable unsaturated monomer for radical polymerization are mixed, wherein a mixing ratio of the film-forming resin to the silane compound is in such a range that the silane compound is desirably used in an amount of from 2 to 60% by weight corresponding to an amount of from 40 to 98% by weight of the film-forming resin to be used. When the amount of the film-forming resin is less than 40% by weight, the resulting silane-modified resin has poor film-forming properties, and a large amount of irradiation doses of the electron beam are also needed to be economically undesirable. On the other hand, when the amount of the silane compound is less than 2% by weight, the three dimensional crosslinking reaction on the film formation of the silane-modified resin takes place only to such an insufficient extent that a desired improvement in film properties is not obtained. With respect to the amount of the organic solvent and the polymerizable unsaturated monomer for radical polymerization, the organic solvent is used in an amount less than 60 PHR, and the polymerizable unsaturated monomer for radical polymerization is used in an amount less than 100 PHR respectively based on the total amount of both the film-forming resin and the silane compound. When the organic solvent and the polymerizable unsaturated monomer for radical polymerization are concurrently used, the two components may be used in such an amount that the total amount thereof is less than 100 PHR. When higher than the aforementioned upper limits, the aforementioned advantages of the graft polymerization reaction by use of the electron beam cannot be obtained.

Mixing of the aforementioned components in the reaction system may be effected by use of the conventional stirrer, or desirably by use of a kneader, an extruder, and the like when the film-forming resin has such a high molecular weight or is in the state of such a high concentration as to exhibit a high viscosity. The aforementioned mixing may be promoted by heating to a temperature below 150° C., preferably below 100° C. Purging the atmosphere with nitrogen on mixing permits an efficient graft polymerization reaction by irradiation of the electron beam.

Thereafter, the mixture obtained by the aforementioned procedure is placed on a backing plate to be formed into a sheet having a thickness of from 0.1 to 50 mm. The thickness of the sheet is determined depending on a range of the electron beam from an electron beam accelerator. An electron beam is then irradiated onto the mixture formed into the sheet.

The typical examples of the electron beam accelerator used for the electron beam irradiation in the process of the present invention are shown in Table-1. The dose rate of the electron beam to be irradiated is in the range of from $2 \times 10^{-2}$ to 30 Mrad/sec, preferably 0.1 to 25 Mrad/sec, and the total irradiation dose is in the range of from 0.1 to 40 Mrad, preferably 1 to 20 Mrad. When the dose rate is less than $2 \times 10^{-2}$ Mrad/sec, efficiency of graft polymerization is low, and, on the other hand, when greater than 30 Mrad/sec, an increased temperature makes impossible the operation of the device. When the total irradiation dose is less than 0.1 Mrad, the unreacted silane compound remains in a large amount, and, on the other hand, the total irradiation dose more than 40 Mrad is economically undesirable.

TABLE 1

| Type of Accelerator | Voltage (MV) | Current (mA) | Output (KW) |
| --- | --- | --- | --- |
| Van der Graaf electron accelerator | 1.0–3.0 | 0.2–1.0 | 0.2–3 |
| Cockcroft-Walton electron accelerator | 0.5–3.0 | 1–10 | 1–15 |
| Resonance transformer-type electron accelerator | 1.0–2.0 | 0.3–66 | 6–12 |
| Dynamitron electron accelerator | 0.75–3.0 | 10–50 | 1–50 |
| Linear-type electron accelerator | 4–10 | 0.2–0.35 (mean) | 1–50 |
| Low energy type electron accelerator | 0.20 | 20–200 | 5–40 |
| Insulated core transformer-type accelerator | 0.20–0.75 | 20–200 | 20–100 |
| Oil immersion transformer-type accelerator | 0.30–0.60 | 100–200 | 30–60 |

A product thus obtained by the electron beam irradiation according to the process of the present invention may be, if required, pulverized and dissolved in an organic solvent to be used as a coating composition.

The film-forming resin used in the present invention may be widely selected from any well-known resins having film-forming properties. Examples of the film-forming resin include copolymers of at least one selected from olefin monomers having 2 to 10 carbon atoms such as ethylene, propylene, butene and the like with other monomers such as vinyl acetate, acrylic acid, methacrylic acid, acrylic ester, methacrylic ester and the like; halogenated polyolefin resins such as chlorinated polyethylene, chlorinated polypropylene, polyvinyl chloride, polychloroprene resin and the like, and copolymers thereof; polystyrene and copolymers thereof; phenoxy resin; polyether resins such as polyethylene glycol, polypropylene glycol and the like; epoxy resin; polyamide resin; polyester resin; acrylic resin; silicone resin; modified fluorine resin; and the like, being used singly or in combination. Of these, the preferable resins, which are inexpensive and have good film properties with remarkably modified effects, include chlorinated polyethylene, chlorinated polypropylene, polyvinyl chloride, polystyrene, phenoxy resin, epoxy resin, arcylic resin and polyester resin. The aforementioned resins are suitably soluble in an organic solvent for use in the coating composition.

The silane compound used in the graft polymerization reaction onto the film-forming resin includes the compounds represented by the following general formula:

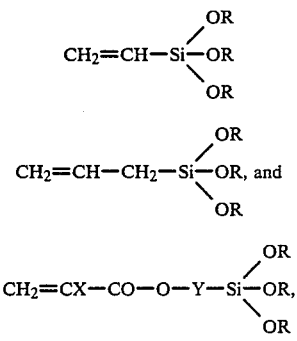

where R is an alkyl group having 1 to 5 carbon atoms, X is H or —CH$_3$, and Y is an alkylene group having 1 to 5 carbon atoms.

Specific examples of the silane compound include vinylsilanes such as trimethoxyvinylsilane, triethoxyvinylsilane, tripropoxyvinylsilane, tributoxyvinylsilane, tripentoxyvinylsilane, tris(β-methoxyethoxy)-vinylsilane, and the like; allylsilanes such as trimethoxyallylsilane, triethoxyallylsilane, tripropoxyallylsilane, tributoxyallylsilane, tripentoxyallylsilane, and the like; acrylsilanes such as acryloxymethyltrimethoxysilane, methacryloxymethylmethoxysilane, acryloxyethyltrimethoxysilane, methacryloxyethyltrimethoxysilane, acryloxypropyltrimethoxysilane, methacryloxypropyltrimethoxysilane, acryloxybutyltrimethoxysilane, methacryloxybutylmethoxysilane, acryloxyethyltriethoxysilane, methacryloxyethyltriethoxysilane, methacryloxyethyltripropoxysilane, acryloxypropyltributoxysilane, methacryloxypropyltripentoxysilane, and the like, being used singly or in combination. Of these unsaturated silanes, vinylsilanes and allylsilanes are preferred in the present invention because these silane compounds have no oxygen bond positioned between an unsaturated group as a functional group for graft polymerization and an alkoxysilane group as a crosslinkable functional group on film formation, and consequently the resulting film has excellent properties in water resistance, durability, and the like. An attempt to react these silane compounds with the film-forming resin by the conventional catalytic reaction may result in little modifying effect because of low reactivity therein. Moreover, the vinylsilanes are more reactive than allylsilanes and are more preferable silne compounds in the present invention.

The polymerizable unsaturated monomer for radical polymerization used as required in the present invention includes such well known compounds as acrylic acid, methacrylic acid, acrylic ester, methacrylic ester, styrene, acrylonitrile, vinyl ester, vinyl ether, and the like.

The organic solvent used as required in the electron beam irradiation in the process of the present invention includes well known solvents such as of hydrocarbons, alcohols, esters, ketones, and ethers.

The film-forming resin composition essentially consisting of the silane-modified resin as obtained according to the process of the present invention is dissolved in an organic solvent for coating. The organic solvent to be used herein is not specifically limited, but may be the same as those used on the electron beam irradiation as mentioned above. The film-forming resin composition may be used as it is, of course, or may be used along with the conventionally incorporated additives to the coating composition such as extender pigments, color pigments, metallic flake pigments and the like.

Moreover, the film-forming resin composition may be incorporated into an inorganic coating composition or into an inorganic zinc-rich coating composition, whereby the coating compositions may be improved in adherance and flexibility. The aforementioned inorganic coating compositions include, for example, such coating compositions that a vehicle component used therein is at least one selected from alkali silicates represented by the general formula: $M_2O \cdot xSiO_2$ where M is Na, K, Li, or $R'_4N$ where R' is $-CH_2-OH$ or $-C_2H_4-OH$, and x is an integer; a colloidal silica; metal biphosphates represented by the general formula: $M_2O \cdot xP_2O_5$ where M is a multivalent metal selected from Al, Mg, Ca, Fe, Cu, Ba, Ti, Mn, Zn and the like, and x is a positive number; alkyl or aryl silicates where alkyl or aryl is selected from, for example, methyl, ethyl, butyl, octyl, lauryl, phenyl, and the like; and the like. The inorganic zinc-rich coating composition includes, for example, such coating compositions as to be prepared by incorporating a large amount of zinc powder into the vehicle component such as the aforementioned alkali silicate, the alkyl silicate or the like. The ratio of the amount to be incorporated of the film-forming resin composition in the present invention to the amount of the aforementioned coating compositions may be arbitrarily selected depending on the purpose thereof, but the film-forming resin composition may be incorporated into the coating composition preferably in an amount of from 1 to 50 parts by weight as the solid content, more preferably 1 to 10 parts by weight as the solid content per 100 parts by weight of the vehicle component as the solid content.

The film-forming resin composition of the present invention is coated so that the alkoxy group bonded onto the silane-modified resin may be hydrolyzed by the moisture in the air to form a three dimensionally crosslinked and cured film. The crosslinking reaction mechanism due to the alkoxysilane group is shown as follows:

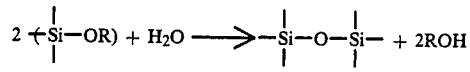

Water may be added beforehand to the film-forming resin composition, or water may be sprayed thereon after coating so that the hydrolysis may take place. Moreover, an acid or base compound may be added as a catalyst to the film-forming resin composition so that the hydrolysis may be promoted.

The present invention will be explained more in detail by the following Examples and Comparative Example, in which parts and % are all by weight.

EXAMPLE 1

To a 1 l four necked glass flask equipped with a stirring rod, a nitrogen inlet tube, a thermometer and a condenser tube are charged 250 g of epoxy resin marketed by Shell Chemical Co., Ltd. under the trade name of Epikote 1009, and 250 g of triethoxyvinylsilane to be stirred at 70° C. under an atmosphere of nitrogen and to obtain a uniform mixture of the silane compound with the epoxy resin.

About 100 g of the mixture thus obtained is inserted between a air of square Mylar films having a thickness of 0.1 mm and a width of 30 cm to be formed into a round sheet having a thickness of 2 mm and a diameter of about 24 cm by use of a press. The mixture thus formed into the sheet is exposed as it is to irradiation of a total dose of 20 Mrad under the conditions of an applied voltage of 2 MeV and a dose rate of 5 Mrad/sec by use of Cockcroft-Walton electron accelerator. The resin thus btained is dissolved in methyl ethyl ketone to form a 30% solution thereof, from which a film is formed and dried at room temperature for 7 days. The film thus obtained has a gel fraction of 62%. The gel fraction is determined from a residue remaining after extracting with tetrahydrofuran for 24 hours and means a degree of the three dimensional crosslinking reaction in the process of the present invention, that is, the higher the gel fraction, the higher the degree of the three dimensional crosslinking reaction, consequently meaning the resulting film properties.

EXAMPLES 2-8

The procedures of Example 1 are repeated respectively except that the film-forming resin, the silane compound, the additive on irradiation when used, the irradiation conditions, and the organic solvent used for coating are selected as shown in Table-2 respectively. The results of the gel fractions as a measure of the resulting film properties are shown in Table-2 respectively.

TABLE 2

| Examples | Film-forming resins type | parts | Silane compounds type | parts | Additives on irradiation type | parts | Irradiation conditions Dose rate (Mrad/sec) | Total dose (Mrad) | Film properties Organic solvent for coating | Gel fraction (%) |
|---|---|---|---|---|---|---|---|---|---|---|
| 2 | Epikote 1004 | 70 | triethoxy-silane | 30 | methyl ethyl ketone | 10 | 5 | 20 | methyl ethyl ketone | 45 |
| 3 | Epikote 828 | 97 | triethoxy-silane | 3 | — | — | 5 | 5 | methyl ethyl ketone | 28 |
| 4 | Chlorinated polypropylene (Marketed by Sanyo Kokusaku Pulp Co., Ltd. under the trade name of Super Chlon L) | 90 | triethoxy-silane | 10 | — | — | 5 | 10 | xylene/methyl ethyl ketone (1:1) | 51 |
| 5 | Chlorinated polypropylene (Marketed by Sanyo Kokusaku Pulp Co., Ltd. under the trade name of Super Chlon L) | 80 | allyltri-ethoxy-silane | 20 | styrene | 20 | 15 | 15 | xylene/methyl ethyl ketone (1:1) | 38 |
| 6 | Chlorinated rubber (Marketed by Asahi Denka Kogyo K. K. under the trade name of Denka chlorinated rubber) | 80 | triethoxy-silane | 20 | — | — | 5 | 15 | xylene/methyl ethyl ketone (1:1) | 43 |
| 7 | Acrylic resin (Marketed by Mitsubishi Rayon Co., Ltd. under the trade name of Dianal BR101) | 95 | triethoxy-silane | 5 | — | — | 5 | 2 | toluene | 33 |
| 8 | Acrylic resin (Marketed by Mitsubishi Rayon Co., Ltd. under the trade name of Dianal BR101) | 95 | tris($\beta$-methoxy-ethoxy)vinyl-silane. | 5 | n-butyl acrylate | 10 | 10 | 8 | toluene | 26 |

COMPARATIVE EXAMPLE 1

To 140 parts of a 50% solution of Epikote 1007 in a xylol/methyl isobutyl ketone (1:1) mixed solvent are added 30 parts of triethoxyvinylsilane and one part of dicumyl peroxide for effecting a radical reaction at 140° C. for 10 hours. The resulting solution is formed into a film, which is then dried at room temperature for 7 days. The resulting film has a gel fraction of 2%. This result shows that the three dimensional crosslinking reaction takes place only to a very small extent according to the catalytic reaction.

What is claimed is:

1. Process for the preparation of a three dimensionally crosslinkable film-forming resin composition which process comprises irradiating an electron beam in an irradiation dose of from 0.1 to 40 Mrad onto a mixture of 40 to 98 percent by weight of a film-forming resin consisting of an epoxy resin with 2 to 60 percent by weight of an alkoxysilane compound having a polymerizable unsaturated group for graft polymerization of the alkoxysilane compound onto the film-forming resin and selected from the group consisting of trimethoxyvinylsilane, triethoxyvinylsilane, tripropoxyvinylsilane, tributoxyvinylsilane, tripentoxyvinylsilane, tris($\beta$-methoxyethoxy)vinylsilane, trimethoxyallylsilane, triethoxyallylsilane, tripropoxyallylsilane, tributoxyallylsilane, and tripentoxyallylsilane, to form a solvent soluble coating resin having an alkoxy group capable of crosslinking on curing in the presence of water.

2. The process according to claim 1 wherein an organic solvent which has no polymerizable unsaturated group and which is selected from the group consisting of hydrocarbon, alcohol, ester, ketone and ether, is further added in an amount less than 60 PHR based on the total amount of both the film-forming resin and the alkoxysilane compound to the mixture on irradiation.

3. The process according to claim 1 wherein a polymerizable unsaturated monomer, for the graft polymerization, which has no alkoxysilane group and which is selected from the group consisting of acrylic acid, methacrylic acid, acrylic ester, methacrylic ester, styrene, acrylonitrile, vinyl ester and vinyl ether, is added in an amount less than 100 PHR based on the total amount of both the film-forming resin and the alkoxysilane compound to the mixture on irradiation.

4. The process according to claim 1 wherein an organic solvent which has no polymerizable unsaturated group and which is selected from the group consisting of hydrocarbon, alcohol, ester, ketone and ether, and a polymerizable unsaturated monomer, for the graft polymerization, which has no alkoxysilane group and which is selected from the group consisting of acrylic acid, methacrylic acid, acrylic ester, methacrylic ester, styrene, acrylonitrile, vinyl ester and vinyl ether, is added in a total amount less than 100 PHR based on the total amount of both the film-forming resin and the alkoxysilane compound to the mixture on irradiation.

5. The process according to claim 1 wherein the alkoxysilane compound is a vinylsilane selected from the group consisting of trimethoxyvinylsilane, triethoxyvinylsilane, tripropoxyvinylsilane, tributoxyvinylsilane, tripentoxyvinylsilane and tris($\beta$-methoxyethoxy)vinylsilane.

* * * * *